United States Patent
Hayakawa et al.

(10) Patent No.: US 11,846,527 B2
(45) Date of Patent: Dec. 19, 2023

(54) SENSOR DEVICE, CABLE WITH SENSOR, AND COMPOSITE CABLE

(71) Applicant: Hitachi Metals, Ltd., Tokyo (JP)

(72) Inventors: Yoshikazu Hayakawa, Tokyo (JP); Tomoyuki Murayama, Tokyo (JP); Yuta Sugiyama, Tokyo (JP); Hirotaka Eshima, Tokyo (JP)

(73) Assignee: PROTERIAL, LTD., Tokyo (JP)

( * ) Notice: Subject to any disclaimer, the term of this patent is extended or adjusted under 35 U.S.C. 154(b) by 0 days.

(21) Appl. No.: 17/581,088

(22) Filed: Jan. 21, 2022

(65) Prior Publication Data

US 2022/0146284 A1 May 12, 2022

Related U.S. Application Data

(63) Continuation of application No. 16/837,808, filed on Apr. 1, 2020, now Pat. No. 11,262,217.

(30) Foreign Application Priority Data

Apr. 3, 2019 (JP) .................................. 2019-071248

(51) Int. Cl.
*G01D 5/14* (2006.01)
*H01B 7/18* (2006.01)
*H01B 7/02* (2006.01)

(52) U.S. Cl.
CPC .................. *G01D 5/14* (2013.01); *H01B 7/02* (2013.01); *H01B 7/18* (2013.01)

(58) Field of Classification Search
CPC ........................................................ G01D 5/14
See application file for complete search history.

(56) References Cited

U.S. PATENT DOCUMENTS

| 3,858,433 | A | 1/1975 | Nearhoof |
| 4,015,117 | A | 3/1977 | Wicklund |
| 7,154,077 | B2 | 12/2006 | Miklatzky |
| 7,859,250 | B2 | 12/2010 | Wallrafen |
| 9,103,647 | B2 * | 8/2015 | Takiguchi ............. G01D 5/145 |

(Continued)

FOREIGN PATENT DOCUMENTS

| CN | 207165260 U | 3/2018 |
| JP | 2008-506890 A | 3/2008 |

(Continued)

OTHER PUBLICATIONS

Japanese Office Action dated Jul. 5, 2022, in corresponding Japanese Patent Application No. 2019-071248, with an English translation thereof.

(Continued)

*Primary Examiner* — Walter L Lindsay, Jr.
*Assistant Examiner* — Milton Gonzalez
(74) *Attorney, Agent, or Firm* — MCGINN I.P. LAW GROUP, PLLC.

(57) ABSTRACT

A sensor device includes a first pair of connection terminals extended from a first sensor and a second pair of connection terminals extended from a second sensor. A first negative connection terminal that is a negative connection terminal of the first pair of connection terminals and a second negative connection terminal that is a negative connection terminal of the second pair of connection terminals are electrically connected to each other.

14 Claims, 7 Drawing Sheets

(56) References Cited

U.S. PATENT DOCUMENTS

| | | | |
|---|---|---|---|
| 10,048,143 | B2 | 8/2018 | Toyama et al. |
| 10,315,590 | B2 | 6/2019 | Hayakawa et al. |
| 10,457,228 | B2 | 10/2019 | Hayakawa et al. |
| 2007/0236223 | A1 | 10/2007 | Wallrafen |
| 2008/0238417 | A1 | 10/2008 | Suzuki |
| 2017/0336276 | A1 | 11/2017 | Toyama et al. |
| 2017/0355883 | A1 | 12/2017 | Hayakawa et al. |
| 2019/0094044 | A1 | 3/2019 | Onimoto et al. |
| 2019/0232893 | A1 | 8/2019 | Hayakawa et al. |

FOREIGN PATENT DOCUMENTS

| | | | |
|---|---|---|---|
| JP | 2008-249369 A | 10/2008 | |
| JP | 2017-207402 A | 11/2017 | |
| JP | 2017-227560 A | 12/2017 | |

OTHER PUBLICATIONS

United States Notice of Allowance dated Oct. 25, 2021 in U.S. Appl. No. 16/837,808.
United States Office Action dated Jun. 11, 2021 in U.S. Appl. No. 16/837,808.
Japanese Office Action, dateed Oct. 4, 2022, in Japanese Patent Application No. JP 2019-071248 and English Translation thereof.
Chinese Office Action dated May 30, 2023, in corresponding Chinese Patent Application No. 202010249802.1, with an English translation thereof.

* cited by examiner

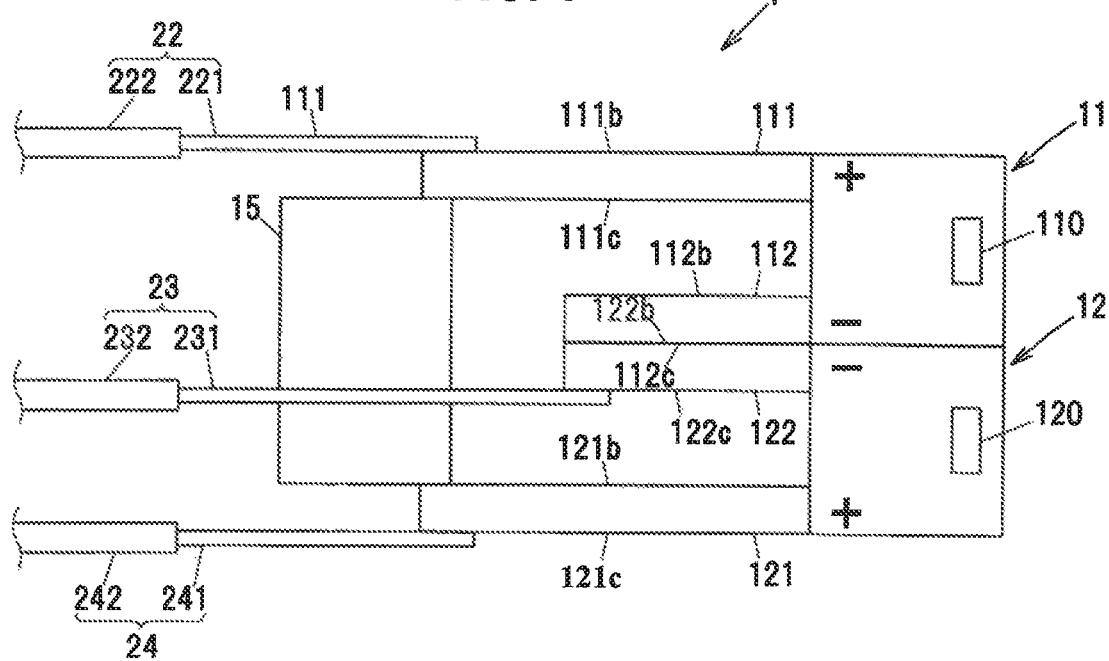

SENSOR DEVICE, CABLE WITH SENSOR, AND COMPOSITE CABLE

CROSS-REFERENCE TO RELATED APPLICATIONS

The present application is a Continuation Application of U.S. patent application Ser. No. 16/837,808, filed on Apr. 1, 2020, which is based on and claims priority from Japanese Patent Application No. 2019-071248 filed on Apr. 3, 2019, the entire contents of which are hereby incorporated by reference.

BACKGROUND OF THE INVENTION

1. Field of the Invention

This invention relates to a sensor device, a cable with sensor, and a composite cable.

2. Description of the Related Art

In recent years, a cable with sensor comprising plural sensors (e.g. magnetic sensors) for redundancy or improvement in accuracy of detection has been provided (see e.g., JP-A-2017-227560). A cable with sensor described in JP-A-2011-227560 comprises a cable and a sensor unit arranged at an end of the cable.

The sensor unit comprises a magnetic detection element to detect a magnetic field from an object to be detected, a signal processing circuit to process a signal output from the magnetic detection element, and plural magnetic sensors each comprising a plate-like detecting section having a covering body that collectively covers the magnetic detection element and the signal processing circuit. The respective detecting sections are stacked in a direction that is opposite to the sensor unit and the object to be detected.

Each magnetic sensor comprises a detecting section and a pair of connection terminals extended from the detecting section. The cable with sensor comprises plural pairs of electric wires each of which is connected to a pair of connection terminals of each of the plural magnetic sensors.
Patent Document 1: JP-A-2017-227560

SUMMARY OF THE INVENTION

However, for the cable with sensor described in JP-A-2017-227560, it is necessary to increase two cables as increasing one magnetic sensor. Thus, it is desired that the number of the electric wires is reduced when the cable with sensor comprises plural sensors.

Accordingly, it is an object of the invention to provide a sensor device comprising a. structure capable of reducing the number of electric wires when the cable with sensor comprises plural sensors, a cable with sensor comprising the plural sensors, and a composite cable.

A feature of the present invention provides a sensor device, comprising: a first pair of connection terminals extended from a first sensor; and a second pair of connection terminals extended from a second sensor, wherein a first negative connection terminal that is a negative connection terminal of the first pair of connection terminals and a second negative connection terminal that is a negative connection terminal of the second pair of connection terminals are electrically connected to each other.

Effect of the Invention

According to the present invention, it is possible to provide a sensor device comprising the structure capable of reducing the number of electric wires when a cable with sensor comprises plural sensors, a cable with sensor comprising the plural sensors, and a composite cable.

BRIEF DESCRIPTION OF THE DRAWINGS

Next, the present invention will be explained in more detail in conjunction with appended drawings, wherein:

FIG. 4 is a schematic partial diagram showing a cable with sensor according to a variation of the invention;

DETAILED DESCRIPTION OF THE PREFERRED EMBODIMENTS

Embodiments

Next, the embodiments of the invention will be described below with reference to the appended drawings. Meanwhile, the embodiments described below merely indicates the preferred examples in applying the invention. Although the embodiments specifically indicate some preferable technical features, the technical scope according to the invention is not to be limited to the specific embodiments. In addition, a dimensional ratio of each element in each drawing does not necessarily correspond to a dimensional ratio of an actual sensor device, a cable with sensor, and a composite cable.

Further, in the following description, "one" and "the other" mean electrical polarities different from each other. For example, when the positive polarity is referred to as "one side", the negative polarity is referred to as "the other side". Meanwhile, when the negative polarity is referred to as "one side", the positive polarity is referred to as "the other side". In addition, both the positive polarities or both the negative polarities are also referred to as "the same side". Further, the relationship between the positive polarity and the negative polarity is also referred to as "different side" from each other.

(Explanation of Cable with Sensor)

Figure 1:
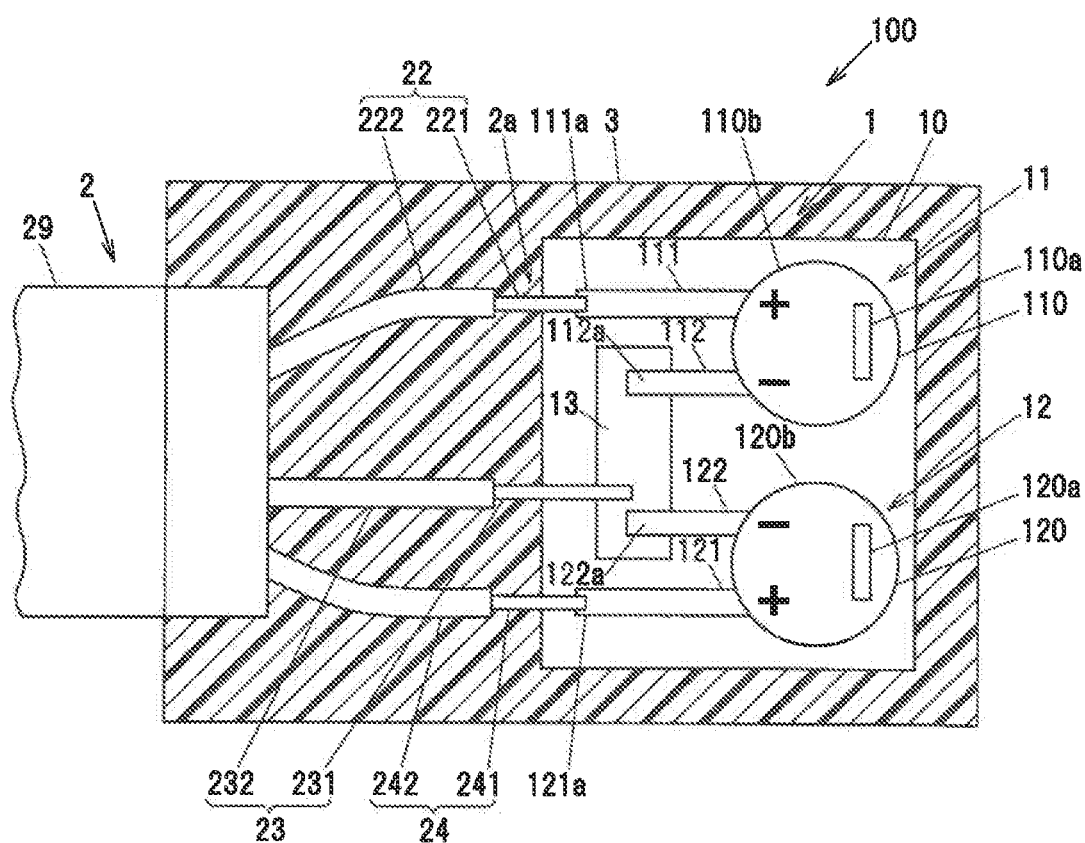
FIG. 1 is a schematic side view showing an example of the structure of a cable with sensor according to one embodiment of the invention.

FIG. 1 is a schematic side view showing an example of the structure of the cable with sensor according to an embodiment of the invention. As shown in FIG. 1, a cable with sensor 100 according to the embodiment of the invention comprises a composite cable 2, a sensor unit 1 arranged at an end 2a of the composite cable 2, and a housing 3 made of a resin mold to collectively cover the sensor unit 1 and the end 2a of the composite cable 2. The sensor unit 1 is an example of the sensor device according to the present invention.

In addition, FIG. 1 is a breakaway view showing the composite cable 2 excepting a first pair of electric wires 21 and extracting second to fourth electric wires 22, 23, 24, and showing a cross section of the housing 3. Further, the composite cable 2 shown in FIG. 1 is viewed from a direction substantially perpendicular to a cross section cut along a line A-A' in FIG. 2.

(Sensor Unit 1)

As shown in FIG. 1, the sensor unit 1 comprises a circuit board 10 comprising a circuit pattern (not shown), and a first sensor 11 and a second sensor 12 soldered on the circuit board 10. In the following, although the embodiment comprising two sensors in the sensor unit 1 will be explained for the convenience of explanation, the number of sensors is not limited to two. The number of sensors may be three or more. In addition, the first sensor 11 and the second sensor 12 are sensors that transmit signals based on the strength of an electric current.

The first sensor 11 comprises a first detecting section 110 and a first pair of (two) connection terminals 111 and 112 extended from the first detecting section 110. Each of the first pair of connection terminals 111 and 112 comprises a positive connection terminal 111 (hereinafter, it is referred to as a first positive connection terminal), and a negative connection terminal 112 (hereinafter, it is referred to as a first negative connection terminal). The first negative connection terminal 112 is an example of one first connection terminal. The first positive connection terminal 111 is an example of the other first connection terminal.

The first detecting section 110 comprises a first magnetic detection element 110a to detect a magnetic field from a magnetic encoder (not shown) as an object to be detected and a first signal processing circuit (not shown) to process a signal output from the first magnetic detection element 110a.

The first positive connection terminal 111 and the first negative connection terminal 112 are respectively extended from one end 110b of the first detecting section 110. The first positive connection terminal 111 and the first negative connection terminal 112 are arranged substantially parallel to each other. In the embodiment, a tip end 111a of the first positive connection terminal 111 (the opposite end to the first detecting section 110) and a second central conductor 221 corresponding to the tip end 111a (see FIG. 2) are electrically connected by electric resistance welding.

The second sensor 12 comprises a second detecting section 120 and a second pair of (two) connection terminals 121, 122 extended from the second detecting section 120. Each of the second pair of connection terminals 121, 122 comprises a positive connection terminal 121 (hereinafter, it is referred to as a second positive connection terminal) and a negative connection terminal 122 (hereinafter, it is referred to as a second negative connection terminal). The second negative connection terminal 122 is an example of one second connection terminal. The second positive connection terminal 121 is an example of the other second connection terminal.

As with the first detecting section 110, the second detecting section 120 comprises a second magnetic detection element 120a to detect a magnetic field from the magnetic encoder and a second signal processing circuit (not shown) to process signal output from the second magnetic detection element 120a.

The second positive connection terminal 121 and the second negative connection terminal 122 are respectively extended from one end 120b of the second detecting section 120. The second positive connection terminal 121 and the second negative connection terminal 122 are arranged substantially parallel to each other. Further, the second positive connection terminal 121 and the second negative connection terminal 122 are arranged substantially parallel to the first positive connection terminal 111 and the first negative connection terminal 112 and arranged to be oriented toward substantially the same direction.

In addition, a tip end 121a of the second positive connection terminal 121 (the opposite end to the second detecting section 120) and a fourth central conductor corresponding to the tip end 121a (see e.g., FIG. 2) are electrically connected by electric resistance welding.

The first sensor 11 and the second sensor 12 are arranged to be opposite to each other in a direction substantially perpendicular to the respective connection terminals 111, 112, 121, and 122 in a plane including the connection terminals 111, 112, 121, and 122 which are arranged substantially parallel to each other (i.e., a plane parallel to the circuit board 10). In the embodiment, the first sensor 11 and the second sensor 12 are arranged in such a manner that the negative connection terminals of both sensors are facing to each other. Specifically, the first sensor 11 and the second sensor 12 are arranged in such a manner that the first negative connection terminal 112 and the second negative connection terminal 122 are opposite to each other.

The first negative connection terminal 112 and the second negative connection terminal 122 are electrically connected to each other by a connection member 13. Specifically, a tip end 112a of the first negative connection terminal 112 and a tip end 122a of the second negative connection terminal 122 are respectively electrically connected to the connection member 13 by electric resistance welding. The connection member 13 is made of a metal such as copper, iron, and aluminum.

Further, a third central conductor 231 (see FIG. 2) corresponding to the connection member 13 is electrically connected to the connection member 13 by electric resistance welding. That is, both the first negative connection terminal 112 and the second negative connection terminal 122 are electrically connected to the third central conductor 231 via the connection member 13. In other words, a circuit connected to the third central conductor 231 is branched to the first negative connection terminal 112 and the second negative connection terminal 122.

According to the electrical connection structure as described above, the negative connection polarity side of the first detecting section 110 and the negative connection polarity side of the second detecting section 120, which are connected to the one electric wire (the third electric wire 23) can be commonly used as a ground (GND). In this manner, it is possible to detect a signal value at the first detecting section 110 and a signal value at the second detecting section 120 respectively by measuring the current flowing to the positive connection polarity side of the first detecting section 110 and the positive connection polarity side of the second detecting section 120 without providing four electric wires.

In FIG. 1, for the convenience of explanation, although the first detecting section 110 and the second detecting section 120 are drawn as circle, the first and second detecting sections 110 and 120 may be formed in e.g. a substantially rectangular shape (a shape in which one of the four corners of the rectangle is chamfered) in the plane view.

(Explanation of Composite Cable 2)

Figure 2:
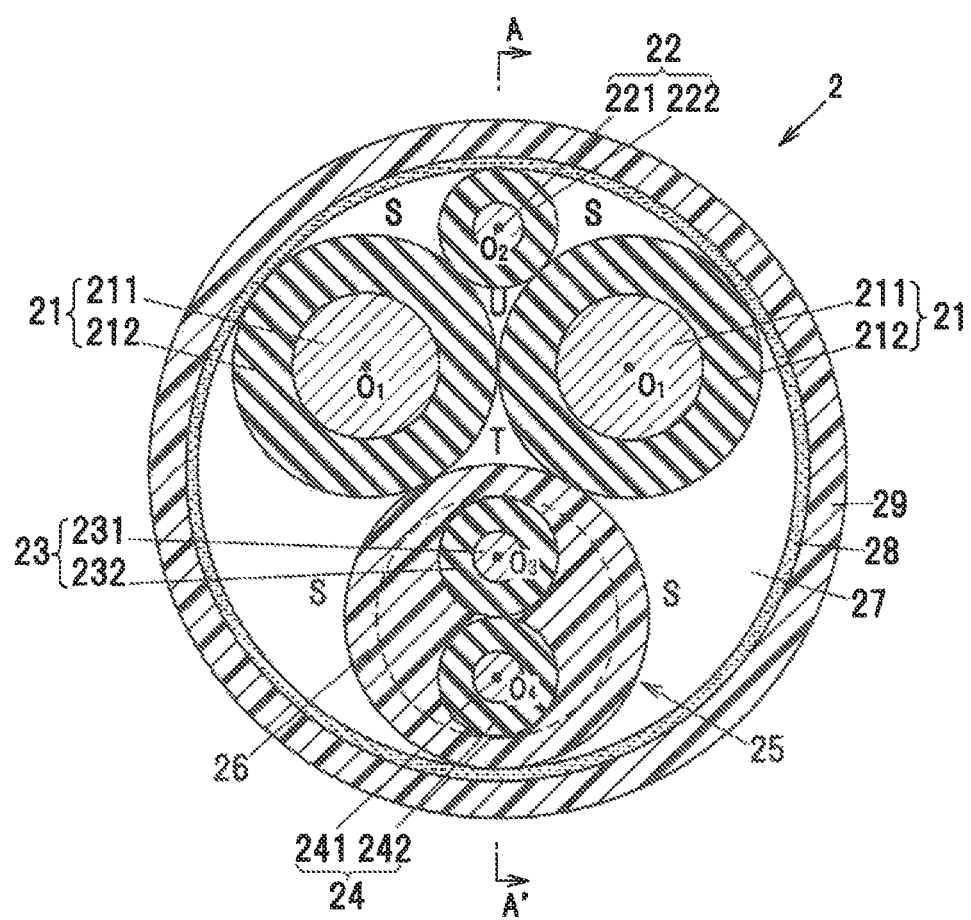
FIG. 2 is a schematic block diagram showing an example of the structure of a composite cable according to one embodiment of the invention.

Next, the composite cable 2 according to the embodiment of the invention will be described below with reference to FIG. 2. FIG. 2 is a cross-sectional view showing an example of the structure of the composite cable according to the embodiment of the invention. As shown in FIG. 2, the composite cable 2 comprises a pair (two) of first electric wires 21, a second electric wire 22, a multi-core wire 25, a tape member 28 covering a periphery of an aggregate unit 27 formed by twisting the four electric wires 21, 21, 22 and 25, and an outer sheath 29 covering an outer periphery of the tape member 28.

The multi-core wire 25 is formed by covering an outer periphery of the third electric wire 23 and the fourth electric wire 24 which are twisted each other with an inner sheath 26. The first electric wire is an example of a large diameter electric wire. The second to fourth electric wires 22, 23, and 24 are examples of small diameter electric wires. In addition, the second to fourth electric wires 22, 23, and 24 are an example of "one electric wire."

In this case, although the composite cable 2 comprising four electric wires in total will be described as an example of the embodiment, the number of the electric wires is not limited to four but may be five or more.

[First Electric Wire 21]

For example, the first electric wire 21 is used as a power line to supply a driving current to an electric parking brake (EPB) motor (not shown) mounted on wheels of the vehicle (not shown) or the like. The first electric wire 21 is formed by covering a first insulator 212 made of an insulation resin such as a crosslinked polyethylene around a first central conductor 211 formed by twisting strands having high conductivity such as copper.

As the strand used for the first central conductor 211, the strand having a diameter of not less than 0.05 mm and not more than 0.30 mm can be used. If the strand having a diameter of less than 0.05 mm is used, enough mechanical strength may not be achieved and flex resistance may be reduced. Meanwhile, if the strand having a diameter of more than 0.30 mm is used, flexibility of the composite cable 2 may be reduced.

An outer diameter of the first central conductor 211 and a thickness of the first insulator 212 may be suitably set in accordance with the magnitude of a desired drive current. For example, when the first electric wire 21 is used for a power line to supply a driving current to the EPB motor, it is preferable to set the outer diameter of the first central conductor 211 to be not less than 1.5 mm and not more than 3.0 mm.

[Second Electric Wire 22, Third Electric Wire 23, and Fourth Electric Wire 24]

In the embodiment, the second electric wire 22, the third electric wire 23, and the fourth electric wire 24 have the same structure and the same shape. Therefore, the second to fourth electric wires 22, 23, and 24 will be described together. For example, the second to fourth electric wires 22, 23, and 24 are used as signal lines for an ABS sensor (not shown) mounted on the wheels or the like.

The second to fourth electric wires 22, 23, and 24 are respectively formed by covering second to fourth insulators 222, 232, and 242 made of an insulating resin such as crosslinked polyethylene around second to fourth central conductors 221, 231, and 241 formed by twisting strands having high conductivity such as copper. As the strand used for the second to fourth central conductors 221, 231, and 241, the strand having a diameter of not less than 0.05 mm and not more than 0.30 mm can be used together with the first central conductor 211.

Outer diameters of the second to fourth electric wires 22, 23, and 24 are respectively smaller than the outer diameter of the first electric wire 21. In other words, the outer diameter of the first electric wire 21 is larger than the outer diameters of the second to fourth electric wires 22, 23, and 24. In addition, the outer diameters of the second to fourth electric wires 22, 23, and 24 are equal. Herein, "equal" does not mean only that it is completely the same, including dimensional error.

Specifically, the second to fourth electric wires 22, 23, and 24 respectively have the outer diameters of not less than 1.0 mm and not more than 1.8 mm. In addition, the second to fourth central conductors 221, 231, and 241 have the outer diameters of not less than 0.4 mm and not more than 1.0 mm.

[Multi-Core Wire 25]

For the multi-core wire 25, the third electric wire 23 and the fourth electric wire 24 in the state of being contacted and twisted each other, i.e. in the state of providing twisted pair electric wires, are collectively covered by the inner sheath 26. The inner sheath 26 is made of a urethane-based resin such as thermoplastic polyurethane. In addition, an outer diameter of the multi-core wire 25 is larger than the outer diameter of the first electric wire 21.

A twist pitch of the third electric wire 23 and the fourth electric wire 24 (hereinafter, it is referred to as "first twist pitch") may be suitably set such that unnecessary load is applied to the third electric wire 23 and the fourth electric wire 24 with considering the outer diameters of the third electric wire 23 and the fourth electric wire 24. In this case, although the first twist pitch is set at about 30 mm, the first twist pitch is not limited thereto. In addition, the first twist pitch means an interval where any one of the third electrical wire 23 and the fourth electrical wire 24 returns to the same position in a circumferential direction of the multi-core wire 25 along a longitudinal direction of the multi-core wire 25.

[Aggregate Unit 27]

The aggregate unit 27 is referred to as a bundle of electric wires formed by twisting the two first electric wires 21, the one second electric wire 22, and the one multi-core wire 25 (the third electric wire 23 and the fourth electric wire 24). In the embodiment, the second electric wire 22 and the multi-core wire 25 are respectively arranged at one side area and the other side area that are opposite to each other with respect to a plane passing the central axes $O_1$, $O_1$ of the pair of the first electric wires 21. In other words, the second electric wire 22 (see "$O_2$") is arranged at one side with respect to a central line connecting the centers of the pair of first electric wires 21 (see "$O_1$, $O_1$") in the cross-sectional view shown in FIG. 2. Meanwhile, the multi-core wire 25 is arranged at the other side with respect to the central line.

For example, an outer diameter of the aggregate unit 27 is about 5 to 9 mm. A twist pitch of the two first electric wires 21, the one second electric wire 22, and the one multi-core wire 25 (hereinafter, it is referred to as "second twist pitch") in the aggregate unit 27 may be suitably set such that unnecessary load is applied to the two first electric wires 21, the second electric wire 22, and the multi-core wire 25 while considering the outer diameters of the aggregate unit 27. In this case, the second twist pitch may be set at about 50 mm. In addition, the second twist pitch means an interval where any one of the two first electric wires 21, the second electric wire 22, and the multi-core wire 25 returns to the same position in a circumferential direction of the aggregate unit 27 in a longitudinal direction of the aggregate unit 27.

[Tape Member 28]

The tape member 28 is spirally wound around the aggregate unit 27. The tape member 28 contacts both the two first electric wires 21, the one second electric wire 22, and the one multi-core wire 25. The tape member 28 improves workability of the composite cable 2 by not entering an outer sheath 29 into side of the aggregate unit 27. In addition, the tape member 28 is arranged between the aggregate unit 27 and the outer sheath 29, and the tape member 28 has a function to reduce friction between the aggregate unit 27 and the outer sheath 29 in bending.

The tape member 28 is spirally wound around the aggregate unit 27 to partially overlap in a width direction of the tape member 28 (a direction perpendicular to a longitudinal and a thickness direction of the tape member 28). For example, the overlapped width of tape member 28 is not less than one quarter (¼) and not more than one half (½) of the width of the tape member 28.

The width of tape member 28 may be such a width that the tape member 28 would not be wrinkled in wrapping the tape member 28. It is preferable to apply the tape member 28 having a narrower width in accordance with the decrease in the outer diameter of the entire aggregate unit 27. Specifically, when the aggregate unit 27 has the outer diameter of 5 mm to 9 mm, the width of the tape member 28 may be about 20 mm to 50 mm.

A winding pitch of the tape member 28, i.e. the interval along the longitudinal direction that tape member 28 returns to the same position in the circumferential direction (e.g., the interval between the one ends in the width direction) may be suitably set in accordance with the width and the overlapped width (overlapping angle of the tape member 28) of the tape member 28 or the like. Incidentally, it is unnecessary to spirally wind the tape member 28 around the assemble unit 27. For example, the tape member 28 may be wrapped in the longitudinal direction.

[Outer Sheath 29]

The outer sheath 29 covering a periphery of the tape member 28 is provided on the outer periphery of the tape member 28. For example, the outer sheath 29 is made of a urethane resin such as thermoplastic polyurethane.

[Shield Layer]

A shield layer (not shown) may be provided between the tape member 28 and the outer sheath 29, or on an outer periphery of the outer sheath 29 in accordance with the application of the first electric wire 21 or the like. For example, the shield layer is formed by braiding conductive wires.

[Filler]

The aggregate unit 27 may be formed by arranging plural thread-like (fibrous) fillers (not shown) extending in the longitudinal direction of the composite cable 2 between the first electric wire 21 and the second electric wire 22, or a space S formed between the first electric wire 21 and the multi-core wire 25. The aggregate unit 27 may be formed by twisting the fillers together with the first electric wires 21, the second electric wire 22, and the multi-core wire 25. A cross-sectional shape of the aggregate unit 27 with the tape member 28 being wound therearound can be made closer to a circle by arranging the plural fillers.

As the filler, it is possible to use a fibrous material such as polypropylene yarn, spun rayon yarn (rayon staple fiber), aramid fiber, nylon fiber or fiber plastic, a paper or a cotton yarn. The filler may be also arranged in a valley T surrounded by the two first electric wires 21 and the multi-core wire 25, or a valley U surrounded by the two first electric wires 21 and the second electric wire 22.

(Housing 3)

A housing 3 collectively covers the sensor unit 1 and the end 2a of the composite cable 2. For example, the housing member 3 has a substantially cylindrical shape. The shape of the housing 3 is not limited to the substantially circular shape. For example, the shape of housing 3 may be a rectangular shape. As the housing 3, the material such as polyamide (PA), nylon (registered trademark), and poly-butylene terephthalate (PBT) can be used. In addition, a fixing member (not shown) to crimp an outer periphery of the housing 3 may be provided around the outer periphery of the housing 3.

<First Variation of the Sensor Unit 1>

Figure 3:
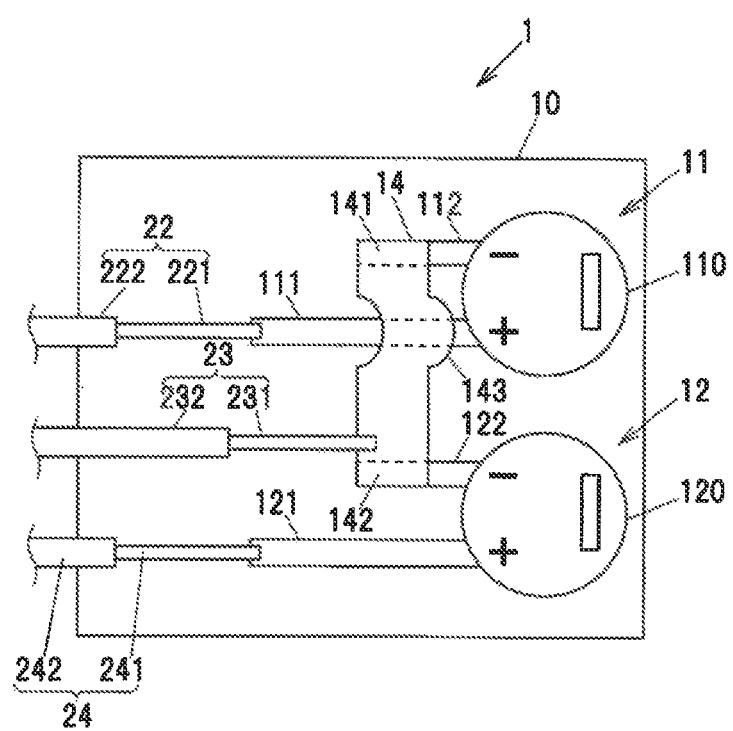
FIG. 3 is a schematic partial diagram showing a cable with sensor according to a variation of the invention.

FIG. 3 is a schematic partial diagram showing the cable with the sensor 100 according to the first variation of the invention. Incidentally, FIG. 3 shows the composite cable 2 in which only the second to fourth electric wires 22, 23, and 24 are shown and the first electric wire 21 and the outer sheath 29 are omitted. In addition, the housing 3 is also omitted in FIG. 3.

As shown in FIG. 3, instead of the connection member 13, a jumper member 14 for electrically connecting the first negative connection terminal 112 and the second negative connection terminal 122 may be provided across the first positive connection terminal 111.

In this case, the first sensor 11 and the second sensor 12 may be arranged in such a manner that the positive polarity sides and the negative polarity sides respectively match each other. In other words, the first sensor 11 and the second sensor 12 may be arranged in such a manner that the positive polarity sides and the negative polarity sides are alternately arrayed each other in a direction substantially perpendicular to the respective connection terminals 111, 112, 121, and 122 in a plane including the respective connection terminals 111, 112, 121, and 122 which are arranged substantially parallel to each other (i.e., a plane parallel to the circuit board 10). In the embodiment, although the first positive connection terminal 111 and the second negative connection terminal 122 are arranged to be adjacent to each other, the first negative connection terminal 112 and the second positive connection terminal 121 may be arranged to be adjacent to each other.

As shown in FIG. 3, for example, the jumper member 14 integrally (as one piece) comprises a first connection portion 141 connected to the first negative connection terminal 112, a second connection portion 142 connected to the second negative connection terminal 122, and a substantially half-cylindrical intermediate portion 143 provided between the first connection portion 141 and the second connection portion 142. The intermediate portion 143 is arranged to jump over the first positive side connection terminal 111 located between the first negative connection terminal 112 and the second negative connection terminal 122.

The jumper member 14 is electrically connected to a third central conductor 231. In other words, the third central conductor 231 is electrically connected to the first negative connection terminal 112 and the second negative connection terminal 122 via the jumper member 14. By the above structure, it is possible to branch the circuit connected to the third central conductor 231 to the first negative connection terminal 112 and the second negative connection terminal 122.

(Second Variation of the Sensor Unit 1)

FIG. 4 is a schematic partial diagram showing the sensor unit 1 according to the second variation of the invention. As with FIG. 3, in FIG. 4, the first electric wire 21, the outer sheath 29, and the housing 3 as well as the circuit board 10 are omitted.

As shown in FIG. 4, the first sensor 11 is stacked on the second sensor 12. Specifically, the first sensor 11 is stacked on the second sensor 12 in a direction perpendicular (the vertical direction in FIG. 4. Hereinafter, it is referred to as "the thickness direction.") to the direction in which the respective connection terminals 111, 112, 121, and 122 are extended.

The first negative connection terminal 112 and the second negative connection terminal 122 are in flat face contact with each other. Specifically, the first negative connection terminal 112 and the second negative connection terminal 122 are integrated by welding a bottom surface 112c of the first negative connection terminal 112 and a top surface 122b of the second negative connection terminal 122.

An insulation layer 15 is provided between the first positive connection terminal 111 and the second positive connection terminal 121 so as to prevent the first positive connection terminal 111 from electrically contacting with the second positive connection terminal 121 each other. Specifically, the insulation layer 15 is arranged so as to respectively contact the bottom surface 111c of the first positive connection terminal 111 and the top surface 121b of the second positive connection terminal 121. The insulation layer 15 is made of an insulating resin such as the cross-linked polyethylene. The insulation layer 15 is an example of an insulation member.

The third central conductor 231 is connected to the first negative connection terminal 112 and the second negative connection terminal 122 that are integrated with each other. In this case, although FIG. 4 shows the third central conductor 231 that contacts the bottom surface 122c of the second negative connection terminal 122, the present invention is not limited thereto. The third central conductor 231 may contact the top surface 112b of the first negative connection terminal 112 or a side surface.

The second central conductor 221 is electrically connected to the first positive connection terminal 111 (e.g., the top surface 111b) by electric resistance welding. The fourth central conductor 241 is electrically connected to the second positive connection terminal 121 (e.g., the bottom surface 121c) by electric resistance welding.

According to the above structure, it is also possible to branch the circuit connected to the third central conductor 231 to the first negative connection terminal 112 and the second negative connection terminal 122. In addition, the negative connection polarity side of the first detecting section 110 and the negative connection polarity side of the second detecting section 120, which are connected to the one electric wire (the third electric wire 23) can be commonly used and the signal value at the first detecting section 110 and the signal value at the second detecting section 120 can be respectively detected by measuring the current flowing in the positive connection polarity of the first detecting section 110 and the positive connection polarity of the second detecting section 120 without arranging four electric wires.

In the above example, although the structure that the first sensor 11 is stacked on the second sensor 12 is explained, the second sensor 12 may be stacked on the first sensor 11.

(First Variation of the Composite Cable 2)

It is enough to configure the composite cable 2 to be provided in the cable with sensor 100 to include an electric wire corresponding to the sensor unit 1 described above, i.e., three electric wires configured to be connected to the first sensor 11 and the second sensor 12. The present invention is not limited to the structure shown in FIG. 2. Next, the variation of the composite cable 2 will be described below with reference to FIGS. 5A, 5B, 6A, 6B, and 6C.

Figure 5A:
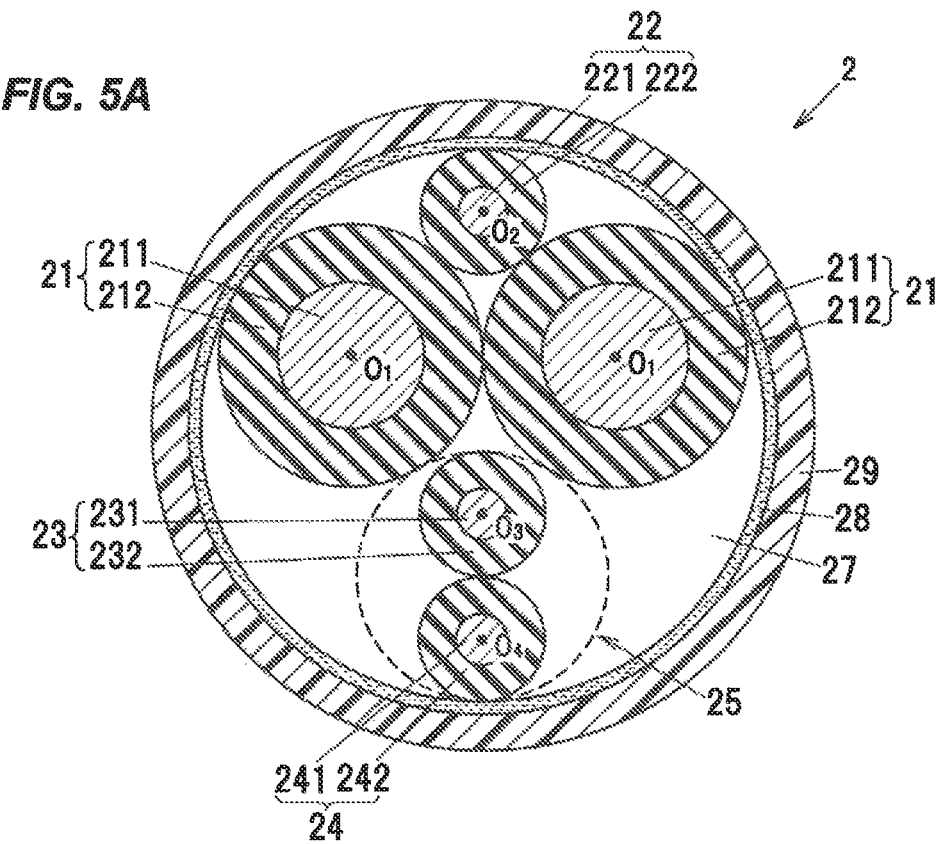
FIGS. 5A and 5B are schematic block diagrams showing the structure of a composite cable according to a variation of the invention.
Figure 5B:
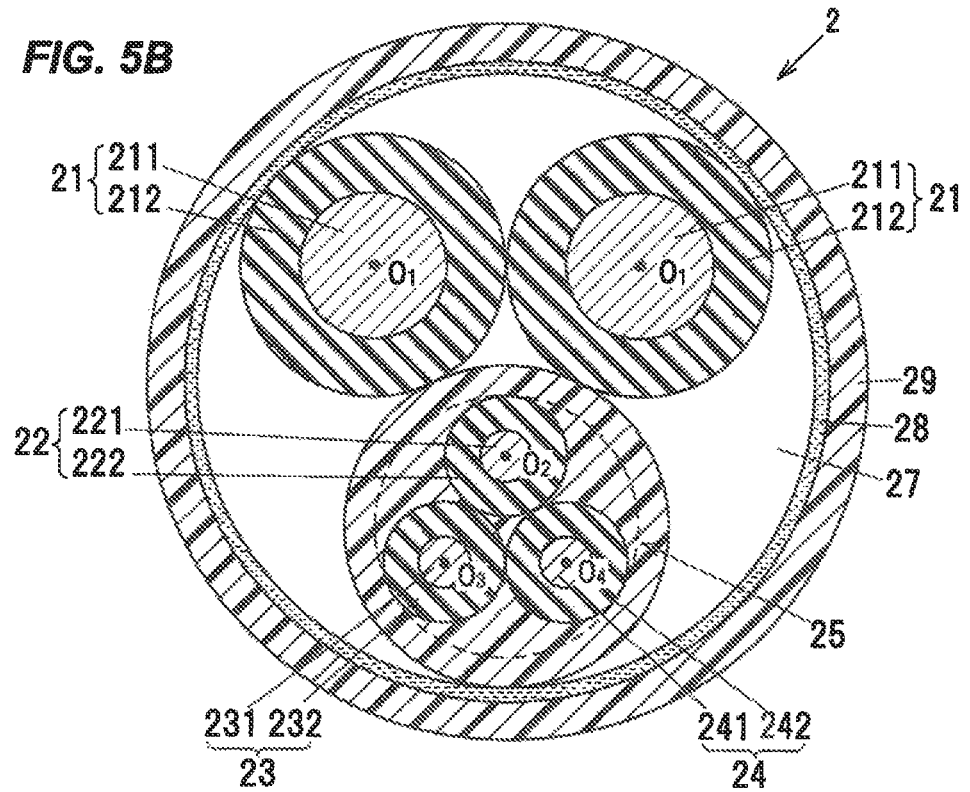

FIGS. 5A and 5B are schematic block diagrams showing the structure of composite cable 2 according to a variation of the present invention. As shown in FIG. 5A, it is not always necessary to provide the inner sheath 26 in the multi-core wire 25. Specifically, the third electric wire 23 and the fourth electric wire 24 may be provided as a twisted wire formed by twisting the third electric wire 23 and the fourth electric wire 24 while being in contact with each other.

The second electric wire 22 is not limited to a structure in which the second electric wire 22 is arranged to be separated from the third electric wire 23 and the fourth electric wire 24. For example, as shown in FIG. 5B, the second electric wire 22 may be in contact with and twisted together with the third electric wire 23 and the fourth electric wire 24.

Specifically, the second electric wire 22, the third electric wire 23, and the fourth electric wire 24 may be integrally covered by the inner sheath 26 while twisting the second electric wire 22, the third electric wire 23, and the fourth electric wire 24 each other. In this case, the second electric wire 22, the third electric wire 23, and the fourth electric wire 24 may be evenly arranged in the circumferential direction of the multi-core wire 25. That is, the second electric wire 22, the third electric wire 23, and the fourth electric wire 24 may be arranged such that a shape surrounded by lines formed by connecting the center of the second electric wire 22 (see "$O_2$"), the center of the third electric wire 23 (see "$O_3$"), and the center of the fourth electric wire 24 (see "$O_4$") each other may be substantially triangular.

(Second Variation of the Composite Cable 2)

Figure 6A:
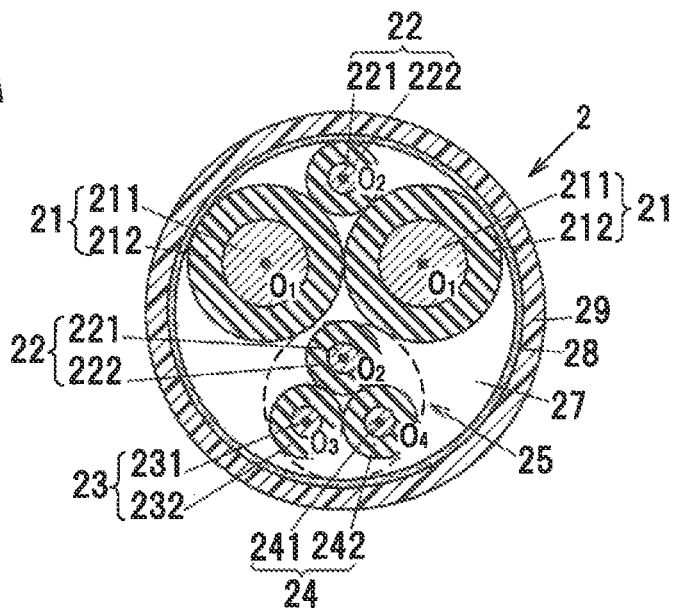
FIGS. 6A to 6C are schematic block diagrams showing the structure of a composite cable according to a variation of the invention.

As shown in FIG. 6A, the inner sheath 26 in the structure shown in FIG. 5B may be omitted.

Figure 6B:
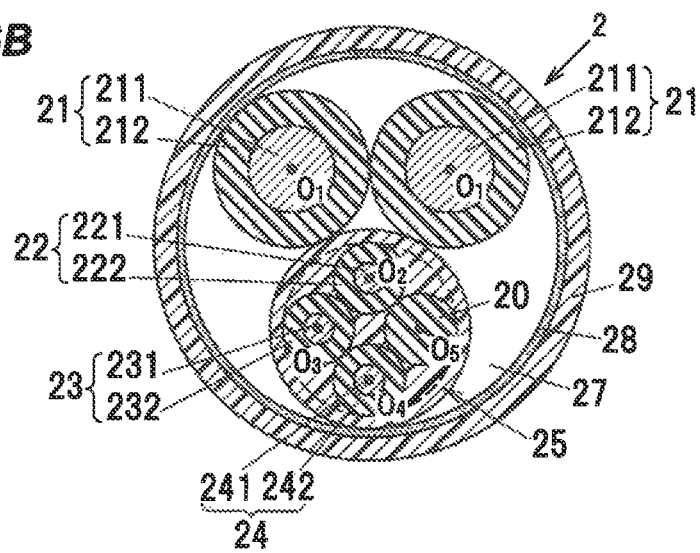
Figure 6C:
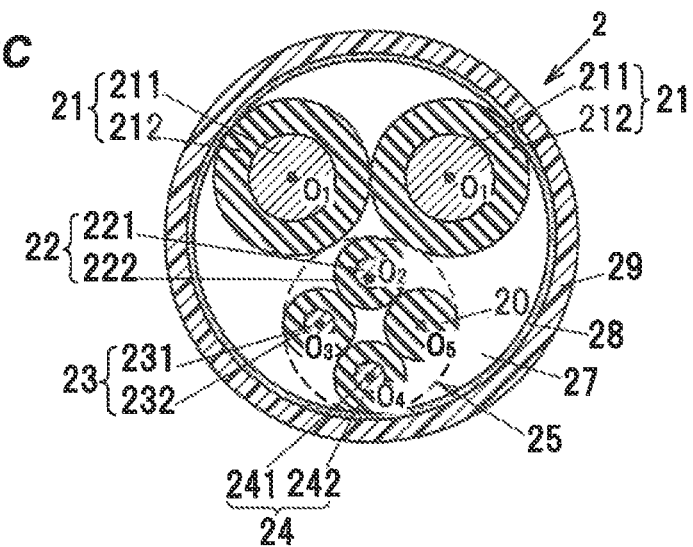

In addition, as shown in FIG. 6B, a dummy wire 20 may be further provided in the multi-core wire 25. For example, a wire made of a scratch-resistant resin may be used as the dummy wire 20. A diameter of the dummy wire 20 is substantially equal to the diameters of the second to fourth electric wires 22, 23, and 24. By providing the dummy wire 20, it is possible to improve the balance of the arrangement of the electric wires in the multi-core wire 25. In addition, as shown in FIG. 6C, the inner sheath 26 in the structure shown in FIG. 6B may be omitted.

SUMMARY OF THE EMBODIMENTS

As described above, according to the embodiment of the present invention, it is possible to provide a sensor device comprising a structure capable of reducing the number of electric wires when the cable with sensor comprises plural sensors, a cable with sensor including the plural sensors, and a composite cable.

Although, the embodiments of the invention have been described, the invention is not to be limited to the embodiments. Meanwhile, it should be noted that all combinations of the features described in the embodiments are not necessary to solve the problem of the invention.

Figure 1B:
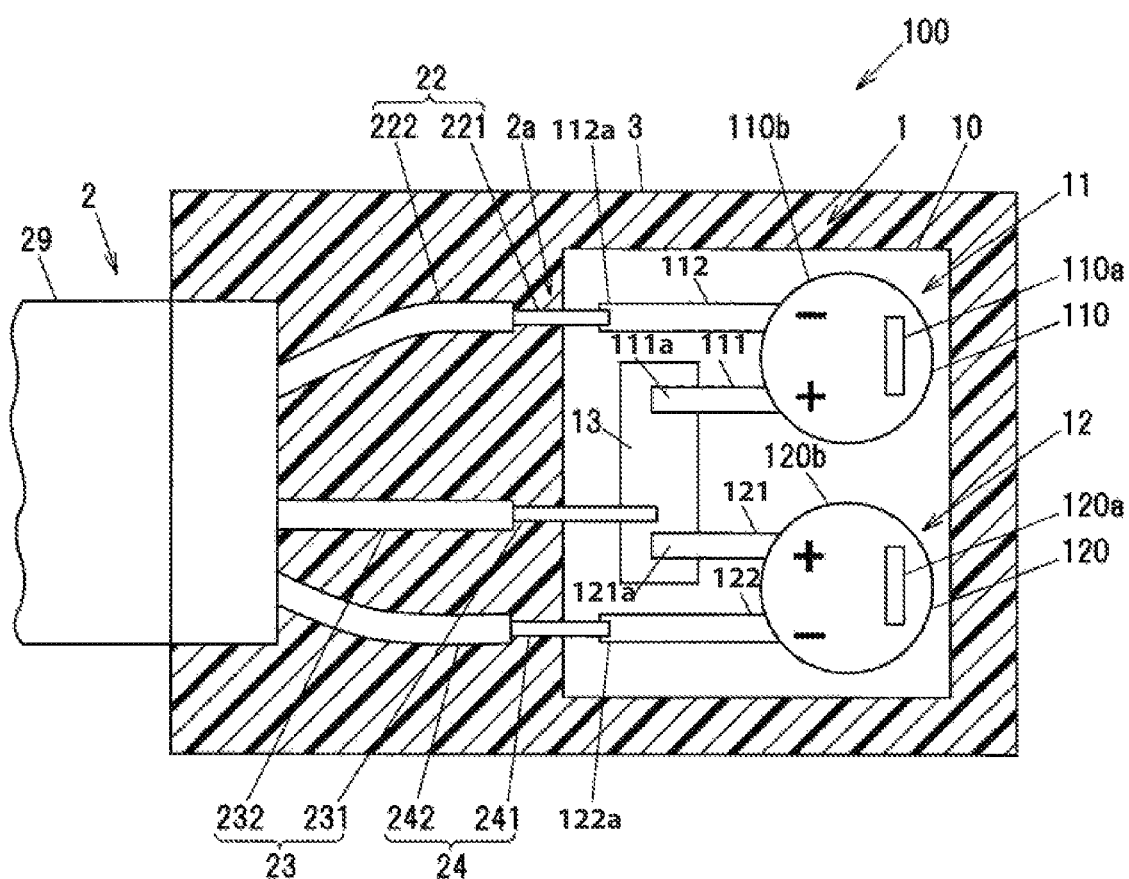
FIG. 1B is a schematic side view showing an example of the structure of a cable with sensor according to a modification of the one embodiment of the invention.

For example, although the first negative connection terminal 112 and the second negative connection terminal 122 are electrically integrated by connecting each other in the above embodiment, the present invention is not limited thereto. As shown in FIG. 1B, it is possible to provide the structure in which the first positive connection terminal 111 and the second positive connection terminal 121 are electrically integrated by connecting each other and the signals are measured respectively from the first negative connection terminal 112 and the second negative connection terminal 122. In addition, it is not always necessary for the composite cable 2 to comprise a pair of the first electric wires 21.

Further, in the above embodiment, although the structure providing two sensors has been described above, the number of sensors may be three or more. For example, when providing three sensors, it will be necessary to provide six small diameter electric wires (electric wires corresponding to the second to fourth electric wires 22, 23, and 24) in the structure described in JP-A-2017-227560. Meanwhile, it is possible to reduce the number of small diameter electric wires to four by using commonly either of the positive polarity side or the negative polarity side in the embodiment according to the invention.

Similarly, when providing four sensors, it will be necessary to provide six small diameter electric wires (electric wires corresponding to the second to fourth electric wires 22, 23, and 24) in the structure described in JP-A-2017-227560. Meanwhile, it is possible to reduce the number of small diameter electric wires to five in the embodiment according to the invention. In conclusion, when providing N sensors (N is a natural number of not less than 2), it will be necessary to provide the small diameter sensors of 2N. Meanwhile, it is possible to reduce the number of the small diameter electric wires to (N+1) in the present invention.

In addition, when providing three or more sensors, the connection member 13, the jumper member 14, and the stacked structure described above may be provided in a suitable combination.

The present invention may provide the sensor device according to [1] to [7], the cable with sensor according to [8] and the composite cable according to [9] as described below.

[1] A sensor device, comprising:
a first pair of connection terminals (111, 112) extended from a first sensor (11); and
a second pair of connection terminals (121, 122) extended from a second sensor (12),
wherein a first negative connection terminal (112) that is a negative connection terminal of the first pair of connection terminals (111, 112) and a second negative connection terminal (122) that is a negative connection terminal of the second pair of connection terminals (121, 122) are electrically connected to each other.

[2] The sensor device according to [1], wherein the second sensor (12) is arranged to be opposite to the first sensor (11) in a plane including the first pair of connection terminals (111, 112), and
wherein the first negative connection terminal (112) and the second negative connection terminal (122) are arranged to be adjacent each other.

[3] The sensor device according to [2], further comprising:
a connection member (13) that electrically connects the first negative connection terminal (112) with the second negative connection terminal (122).

[4] The sensor device according to [1], wherein a first positive connection terminal (111) that is a positive connection terminal of the first pair of connection terminals (111, 112) and the second negative connection terminal (122) are arranged to be adjacent each other.

[5] The sensor device according to [4], further comprising:
a jumper member (14) connecting the first negative connection terminal (112) and the second negative connection terminal (122) while jumping over the first positive connection terminal (111).

[6] The sensor device according to [1], wherein the second sensor (12) is stacked on the first sensor (11), and
wherein the first negative connection terminal (112) and the second negative connection terminal (122) are integrated by plane contacting each other.

[7] The sensor device according to [6], farther comprising:
an insulating member provided between a first positive connection terminal (111) that is a positive connection terminal of the first pair of connection terminals (111, 112) and a second positive connection terminal (121) that is a positive connection terminal of the second pair of connection terminals (121, 122), which is not to electrically connect the first positive connection terminal (111) and the second positive connection terminal (121).

[8] A cable (100) with sensor comprising the sensor device according to any one of [1] to [7], wherein the cable with sensor (100) comprises one electric wire connected to the first negative connection terminal (112) and the second negative connecting terminal (122).

[9] A composite cable (2) that is connectable with the sensor device according to any one of [1] to [7], comprising:
one electric wire configured to connect with the first negative connection terminal (112) and the second negative connecting terminal (122); and
a pair of large diameter electric wires each having a diameter larger than a diameter of the one electric wire.

What is claimed is:

1. A cable with sensor device, comprising:
a first pair of connection terminals extended from a first sensor; and
a second pair of connection terminals extended from a second sensor,
wherein a first positive connection terminal that is a positive connection terminal of the first pair of connection terminals and a second positive connection terminal that is a positive connection terminal of the second pair of connection terminals are electrically connected to each other,
wherein the cable with sensor device further comprises:
an electric wire comprising a central conductor and an insulator covering the central conductor, the electric wire being connected to the first positive connection terminal and the second positive connection terminal; and
a connection member that electrically connects the first positive connection terminal, the second positive connection terminal, and the central conductor,
wherein the second sensor is arranged to be opposite to the first sensor in a plane including the first pair of connection terminals,
wherein the first positive connection terminal and the second positive connection terminal are arranged to be adjacent each other, and
wherein the central conductor is located between the first positive connection terminal and the second positive connection terminal on the connection member.

2. The cable with the sensor device according to claim 1, further comprising a first negative connection terminal and a second negative connection terminal.

3. The cable with the sensor device according to claim 2, wherein the central conductor is branched to the first negative connection terminal and the second negative connection terminal.

4. The cable with the sensor device according to claim 2, wherein the first positive connection terminal and the first negative connection terminal are arranged substantially parallel to each other.

5. The cable with the sensor device according to claim 2, wherein the second positive connection terminal and the second negative connection terminal are arranged substantially parallel to the first positive connection terminal and the first negative connection terminal.

6. The cable with the sensor device according to claim 2, wherein the second positive connection terminal and the second negative connection terminal are arranged substantially parallel to the first positive connection terminal and the first negative connection terminal and are arranged to be oriented toward substantially the same direction.

7. The cable with the sensor device according to claim 1, further comprising a plurality of electric wires each comprising a central conductor and an insulator covering the central conductor.

8. The cable with the sensor device according to claim 7, wherein each insulator of the plurality of electric wires comprises a crosslinked polyethylene.

9. The cable with the sensor device according to claim 7, wherein the plurality of electric wires have a substantially equal diameter.

10. The cable with the sensor device according to claim 7, wherein diameters of the plurality of electric wires are substantially equal to a diameter of the electric wire.

11. The cable with the sensor device according to claim 1, wherein the first positive connection terminal and the second positive connection terminal are opposite each other.

12. The cable with the sensor device according to claim 1, wherein the insulator comprises a crosslinked polyethylene.

13. The cable with the sensor device according to claim 12, wherein the central conductor is formed by twisting strands, a strand of the strands forming the central conductor comprises a diameter of not less than 0.05 mm and not more than 0.30 mm.

14. The cable with the sensor device according to claim 1, wherein an outer diameter of the central conductor is not less than 0.4 mm and not more than 1.0 mm.

* * * * *